United States Patent [19]
Grumstrup et al.

[11] Patent Number: 6,023,763
[45] Date of Patent: Feb. 8, 2000

[54] METHOD OF AND APPARATUS FOR PROTECTING AND UPGRADING SOFTWARE USING A REMOVABLE HARDLOCK

[75] Inventors: Bruce F. Grumstrup; Patrick O. Ryan, both of Marshalltown, Iowa

[73] Assignee: Fisher Controls International, Inc., Clayton, Mich.

[21] Appl. No.: 08/842,050

[22] Filed: Apr. 23, 1997

[51] Int. Cl.[7] .................................................. G06F 12/14
[52] U.S. Cl. .............................................. 713/200; 380/4
[58] Field of Search .............................. 713/200; 380/3, 380/4

[56] References Cited

U.S. PATENT DOCUMENTS

| | | | |
|---|---|---|---|
| 5,008,814 | 4/1991 | Mathur | 364/200 |
| 5,018,096 | 5/1991 | Aoyama | 364/900 |
| 5,138,712 | 8/1992 | Corbin | 395/700 |
| 5,144,664 | 9/1992 | Esserman et al. | 380/20 |
| 5,155,847 | 10/1992 | Kirouac et al. | 395/600 |
| 5,359,730 | 10/1994 | Marron | 395/650 |
| 5,375,206 | 12/1994 | Hunter et al. | 395/200 |
| 5,473,692 | 12/1995 | Davis | 380/25 |
| 5,533,125 | 7/1996 | Bensimon et al. | 380/4 |
| 5,553,143 | 9/1996 | Ross et al. | 380/25 |
| 5,564,038 | 10/1996 | Grantz et al. | 395/491 |
| 5,564,108 | 10/1996 | Hunsaker et al. | 395/800 |
| 5,577,244 | 11/1996 | Killebrew et al. | 395/703 |
| 5,579,479 | 11/1996 | Plum | 395/188.01 |
| 5,826,011 | 10/1998 | Chou et al. | 395/186 |

OTHER PUBLICATIONS

Crypkey Home Page, 2 pp. (Jul. 1997).
Crypkey Software Licensing System User Manual, pp. II, 55–62 (Sep. 1995).
Aladdin Hardlock Home Page, 2 pp. (Jul. 1997).

*Primary Examiner*—Robert W. Beausoliel, Jr.
*Assistant Examiner*—Brian H. Shaw
*Attorney, Agent, or Firm*—Marshall, O'Toole, Gerstein, Murray & Borun

[57] ABSTRACT

A software protection method and apparatus uses a removable hardlock to prevent the unauthorized installation and/or use of a licensed software program. The removable hardlock, when supplied to a user, stores an access variable indicating the number of licenses available for the software program. During installation of the software program on a computer, the removable hardlock is inserted into an external port of the computer and the access variable is read to determine if any licenses for the software program are still available. If so, the software program is installed on the computer in a manner that allows the software program to be run on the computer when the removable hardlock is removed from the external port of the computer. The access variable on the removable hardlock is then decremented to indicate that one of the previously available licenses has now been used. However, when the access variable on the removable hardlock indicates that no further licenses are available, the software program is installed on the computer in a manner that prevents the software program from being implemented on the computer when the removable hardlock is removed from the external port of the computer.

21 Claims, 3 Drawing Sheets

METHOD OF AND APPARATUS FOR PROTECTING AND UPGRADING SOFTWARE USING A REMOVABLE HARDLOCK

TECHNICAL FIELD

The present invention relates generally to software protection methods and devices and, more particularly, to a method of and an apparatus for preventing the unauthorized use of licensed software using a removable hardlock.

BACKGROUND ART

It is known to prevent the unauthorized copying or use of software programs supplied by a software licensor to a licensee using either a hardlock or a softlock protection method. A hardlock protection method requires that a hardlock be inserted into and remain in an external port of a computer or a processor for the licensed software program to run on that computer. The hardlock, which is a physical device typically having a microprocessor and/or a memory unit therein, may store, for example, an access code required by the licensed software to run a on the computer. Thus, although the licensed software program may be loaded onto any computer, the software program will only run on a computer that has the hardlock supplied with that software program inserted into an external port thereof.

While hardlocks operate to prevent unauthorized implementation of a software program, a separate hardlock must be provided for each licensed copy of the software program. Furthermore, a hardlock must be left in an external port of each computer on which the licensed software program is installed while the licensed software program is actually running. This requirement can become problematic if multiple hardlock-protected software programs are to be run on any particular computer. Furthermore, if the hardlock is accidentally damaged or lost, the properly licensed software program cannot be implemented on the computer, which is inconvenient for the licensee.

A softlock protection method typically uses a protection code stored in software supplied with a purchased software program to limit the use or implementation of the software program to a particular machine, such as to one having a specific identification number. Generally, to install a licensed software program protected with a software lock, i.e., a softlock, the purchased software runs an install program that reads the serial number of the hard drive of the computer on which the licensed software program is to be loaded and generates a hard drive code therefrom. A user then contacts the software licensor with the hard drive code to obtain an access code, which the user enters into the computer. The install program then links the access code of the software program to the hard drive serial number and installs the software program on the computer. Thereafter, the softlock only allows the access coded software program to be run on the computer having the hard drive with the previously determined hard drive serial number.

Using a softlock protection method, a user cannot initially install a licensed software program without contacting the software vendor and, furthermore, cannot de-install a licensed software program from one computer and install that program on a different computer without contacting the software vendor. However, contacting the software vendor to obtain access codes and to re-install licensed software programs on different computers is inconvenient, time consuming, and tedious for the licensee.

SUMMARY OF THE INVENTION

The software protection method and apparatus of the present invention uses a removable hardlock to prevent the unauthorized installation and use of a licensed software program. The removable hardlock may have an access variable stored thereon indicating the number of licenses available with the hardlock. During installation of the software program on a particular computer, the removable hardlock is inserted into an external port of the computer and the software is provided to the computer in any convenient manner. An installer associated with the software or the computer then reads the access variable on the hardlock to determine if any licenses for the software program are available. If desired, the access variable may represent the number of unused licenses that have been purchased for the software program. If one or more unused licenses are available, the installer installs the software program on the computer and decrements the access variable to indicate that one of the previously available licenses has now been used. The software may be installed on the computer in a manner that ties the software to the hard drive serial number of the computer to prevent the installed software from being copied to and run on a different computer. After installation is complete, the hardlock can be removed from the external port of the computer without effecting the operation of the software program stored on the computer. The removable hardlock can then be used to install the software program on other computers until the access variable indicates that all of the purchased licenses have been used.

As will be understood, the removable hardlock of the present invention does not require the software licensee to contact the software vendor to obtain access codes, etc. and does not require that a hardlock be inserted into an external port of a computer when the software program is actually being implemented or being run on the computer.

According to another aspect of the present invention, the removable hardlock can be left in the external port of a computer and used to implement a single backup or unlicensed copy of the software program at any time. This function is desirable when, for example, a licensed copy of the software program installed on a computer has been accidentally erased, damaged, or destroyed.

According to a still further aspect of the present invention, the removable hardlock of the present invention may be used to install and run an upgrade program on a computer which has a base program already installed thereon. In this case, the removable hardlock may include one or more variables that indicate the features of, or that otherwise identify, the base program which must be already installed on the computer for the upgrade program to be installed thereon. An installer associated with the computer determines the features of the base program installed on the computer and compares these features with the set of features stored on the hardlock. If the two sets of features match, the installer installs the upgrade program on the computer. Otherwise, the installer recognizes that the upgrade program is not an upgrade to the base program currently installed on the computer and prevents installation of the upgrade program.

DETAILED DESCRIPTION

The software protection method and apparatus of the present invention can be used to assure that, when a software licensor or vendor sends out a software program, the software program can be installed and run on only the number of computers for which a license has been purchased. Furthermore, where any of a number of serial software upgrades of a particular software program are available, the software protection method and system of the present invention can be used to assure that a new software upgrade is only installed and run on a system having base software already upgraded to the level immediately below the level of the new software upgrade. Thus, for example, the software protection method and system of the present invention can be used to distribute software capable of having upgrades A to D in a manner that assures that the upgrade D is only installed on a system having upgrade C already installed thereon.

Figure 1:
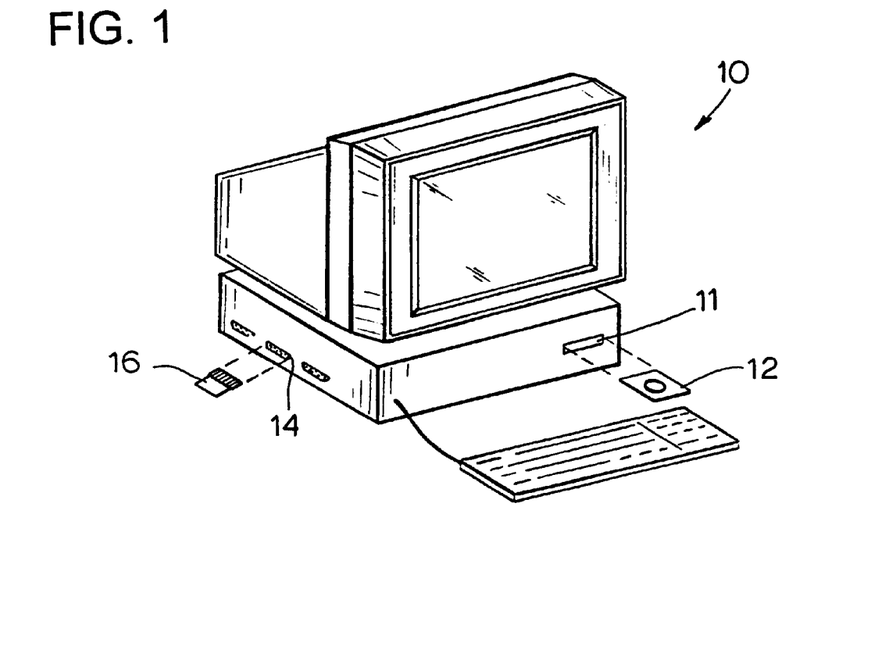
FIG. 1 is a perspective view of a computer capable of installing and running licensed software using a removable hardlock according to the present invention.

Referring now to FIG. 1, a computer 10 which may comprise any machine, processor, microprocessor, hard-wired machine, or any other type of computer capable of implementing or running a software program, such as a base software program or an upgrade software program, is illustrated. If desired, the computer 10 may implement process control software and, as such, may be coupled to process control devices via standard connections. The computer 10 may alternatively be used to run any other type of software and, as such, may be connected to any other hardware necessary for implementation of that software. Likewise, if the software can be implemented solely by the computer 10, the computer 10 may be a stand-alone unit.

As is typically the case, the computer 10 includes an external disk drive 11 adapted to accept a disk 12 having the licensed software program or upgrade program stored thereon. Alternatively, the licensed software program or upgrade program may be provided to the computer 10 in any other desired manner, including, for example, via a communication channel such as the internet, a modem connection, etc. As illustrated in FIG. 1, the computer 10 also includes a set of standard external ports 14 which may be, for example, printer ports, serial ports, etc.

A removable hardlock 16 provided with, for example, the disk 12, is configured to be inserted into one of the external ports 14 of the computer 10. The removable hardlock 16 may comprise a microprocessor and/or any hardwired logic device having a memory therein for storing an indication of the number of licenses that have been purchased or that are available for the software program stored on the disk 12. The hardlock 16 also includes connections for electrically connecting the hardlock 16 to the external port 14 of the computer 10 in any known or desired manner.

Generally, to install the software program stored on the disk 12 on the computer 10, the disk 12 is inserted into the disk drive 11 while the removable hardlock 16 is inserted into, for example, the printer port 14. When an access variable stored within a memory of the hardlock 16 indicates that an unused license for the software program on the disk 12 is available, an installer associated with the computer 10 and/or provided with the disk 12 installs the software program on the computer 10 in a manner that allows the software program to be run by the computer 10 when the hardlock 16 is removed from the external port 14 of the computer 10. After installing the software program on the computer 10 in this manner, the installer changes the access variable on the hardlock 16 to indicate that one less unused license for the software program stored on the disk 12 remains. The hardlock 16 can then be removed from the computer 10 and the installed software can be run thereon.

If, after this installation, the access variable on the hardlock 16 indicates that one or more licenses are still available, the hardlock 16 can then be inserted into one or more further computers and used to install the software program on those computers. In this manner, a single removable hardlock device can be used to install a software program on numerous machines or computers, with the number of installations being set by the software licensor as the number of licenses purchased for the software program.

Figure 2:
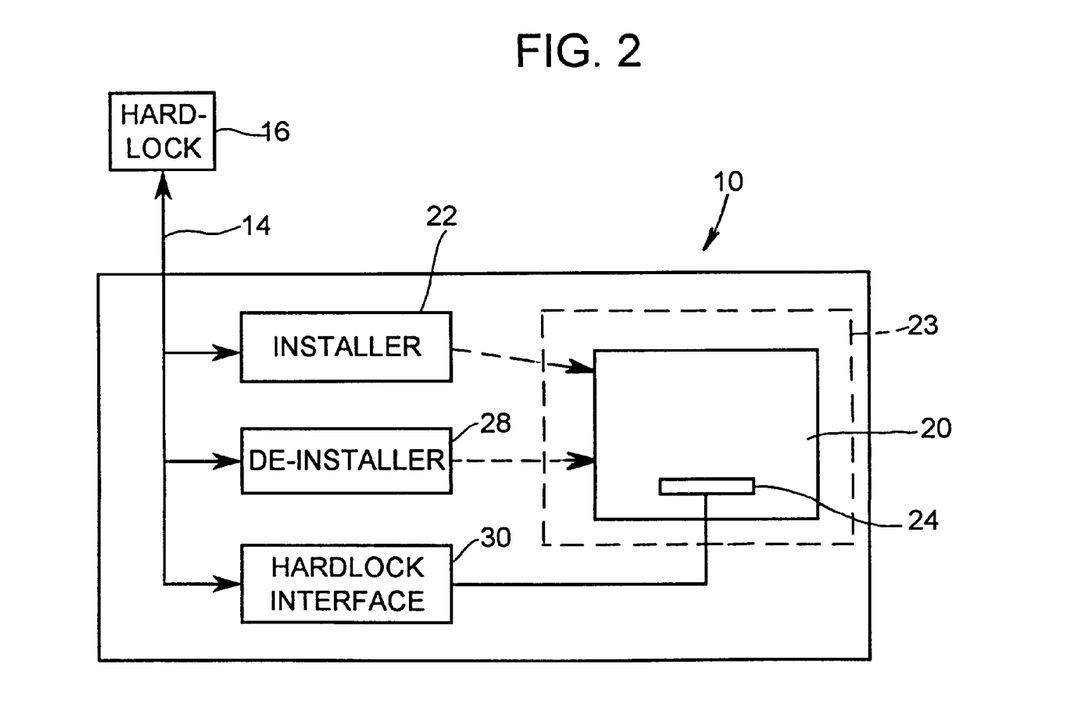
FIG. 2 is a block diagram of the computer and the removable hardlock of FIG. 1.

Referring now to FIG. 2, the components within the computer 10 that install and/or de-install a software program 20 on the computer 10 according to the present invention are illustrated. With the hardlock 16 inserted into the external port 14 of the computer 10, an installer 22 operates to install the software program 20 on the computer 10. The installer 22, which may perform any functions associated with a standard software installer routine and which may be implemented by software stored in the computer 10 and/or provided with the disk 12 (FIG. 1), first loads the software program 20 from the disk 12 into a memory 23 of the computer 10. Thereafter, a communication program within the installer 22 reads the value of an access variable stored within the memory of the hardlock 16 to determine if the hardlock 16 has one or more unused software licenses associated therewith. If the access variable on the hardlock 16 indicates that one or more licenses for the software program are still available, a software conditioner within the installer 22 sets a run flag 24 associated with the software program 20 to a first state indicating that the software program 20 can be implemented or run by the computer 10 after the hardlock 16 is removed from the external port 14. If, however, the access variable on the hardlock 16 indicates that no further software licenses are available, the software conditioner of the installer 22 sets the run flag 24 to a second state indicating that the software program 20 cannot be implemented or run on the computer 10 without the hardlock 16 physically inserted into the external port 14 thereof.

When the installer 22 sets the run flag 24 to the first state, the communication program of the installer 22 changes the access variable stored within the memory of the hardlock 16 to another value indicating that one of the unused software licenses associated therewith has now been used. If, before installation, the access variable stored within the memory of the hardlock 16 indicates that only one unused license remains, then the installer 22 changes the access variable to a value or a state which indicates that no further licenses are available.

Preferably, the installer 22 installs the software program on the computer 10 in a manner that ties the software program to some unique identifier associated with the computer 10, such as the hard drive serial number of the computer 10. This function, which may be implemented using a standard softlock routine with the exception that the access code is provided by the hardlock 16 instead of a software provider, prevents copying and use of the installed software on a different computer or machine. Also, during the installation process, the communication program of the installer 22 can accept information from a user relating to, for example, identification of the computer 10 or the location of the computer 10, and may store such information within the memory of the hardlock 16. If such information has already been stored on the hardlock 16 in a previous installation process, the communication program of the installer 22 may read such information from the hardlock 16 and store it in a memory associated with the program 20 which, thereafter, can be used to prevent the program 20 from being copied and implemented on a different computer, at a different location, etc.

Further, if desired, the hardlock 16 may store an ID number and/or a set of variables that indicate the features or identity of the software program 20 being installed on the computer 10. During installation, the communication program of the installer 22 can read the values of these variables from the hardlock 16 and store indications of the values of these variables in a memory associated with the licensed software program 20. Such an ID number or list of features may be used to assure that an inserted hardlock is the proper hardlock for the software program being installed and/or to control the features purchased by the software user.

During installation of an upgrade program, i.e., a software program having an expanded set of features designed to upgrade a base program having a subset of the expanded set of features, a comparator within the installer 22 determines if the set of features associated with a program already installed on the computer 10 (stored in the computer memory) has all of the features of the base program for which the upgrade program is designed (stored in the hardlock memory). In this manner, the installer 22 verifies that the upgrade program is being installed on a computer that has the licensed base program for which the upgrade program was designed already installed thereon.

For example, in a system capable of running any one version of a software program having a base version A and a set of upgrade versions B, C, and D, the hardlock associated with the upgrade version D may store a list of the features or other identifying indication(s) associated with the previous version C, i.e., the features required to be associated with the program actually installed on the computer before the upgrade version D can be installed on that computer. During installation of the upgrade program, the communication program of installer 22 reads the set of features associated with the software program actually installed on the computer. The comparator of the installer 22 then compares these read features or other indication(s) with the list of features or indication(s) stored in the hardlock 16 as being necessary for the upgrade program to be installed on the computer. If the sets of features or indication(s) match, and the access variable of the hardlock 16 indicates that one or more unused licenses are available for the upgrade program, the installer 22 installs the upgrade program on the computer 10. However, if the two sets of features or indication(s) do not match, which occurs when, for example, the installed program only has features associated with version A and/or version B, then the installer 22 recognizes that the user is trying to install the upgrade version D without having purchased a license for or properly installed upgrade version C and prevents installation of the upgrade version D on the computer 10. In such a case, the installer 22 may inform the user that installation is not allowed because upgrade version C has not been installed on the computer 10.

Of course, the list of features or other indication(s) may be stored in any desired format including as text or, preferably, as a bit field, wherein each bit within the bit field identifies a different feature of the licensed software program or the upgrade program. If desired, the installer 22 may also display the features or other information stored in the hardlock 16 on a display screen and/or may update the display screen to indicate the specific operation being performed during the installation process.

A de-installer 28, which also may be implemented by software stored on the computer 10 and/or provided with the disk 12, operates to allow a user to de-install the software program 20 from the computer 10 when a proper hardlock 16 is inserted into the external port 14. Such a de-installer 28, when run by the operator, removes the program 20 from the memory 23 of the computer 10 and/or changes the run flag 24 to the second state indicating that the software program 20 cannot be run without the hardlock 16 inserted into the external port 14. Thereafter, a communication program within the de-installer 28 changes the access variable stored in the memory of the hardlock 16 to indicate that a further license is available by, for example, incrementing that variable. After this operation, the hardlock 16 can be removed from the computer 10, inserted into at least one other computer and be used to install the software program 20 on the other computer. In this manner, the software licenses initially provided with the hardlock 16 are fully transportable between computers.

It is also desirable to have the hardlock 16 operate to allow the use of a single backup copy of the licensed software program 20, i.e., to allow a single backup copy of the licensed software program 20 to be run on any given computer using the hardlock 16. To assure this function, a hardlock interface 30 associated with the software program 20 includes a detector that detects whenever a proper hardlock 16 (e.g., one having the same features as the features of the installed software program 20) is physically inserted into the external port 14 of the computer 10. When a proper hardlock 16 is installed in the external port 14, the detector of the hardlock interface 30 generates a signal that informs the software program 20 of the existence of the installed hardlock 16. At that time, the software program 20 is enabled to be run by the computer 10 no matter what the setting of the run flag 24 happens to be. Thus, even if the access variable on the hardlock 16 indicates that no unused licenses are available for the software program 20, the software program 20 can be installed and run on any computer as long as the hardlock 16 is actually physically inserted into the external port 14 of that computer. In this manner, the hardlock 16 operates to allow the installation and/or implementation of one copy (a backup copy) of the software program at any time. The backup copy can be moved from one computer to another by simply moving the hardlock 16 to another computer and leaving the hardlock 16 inserted in the external port thereof while running the software program 20. Of course if this backup feature is not desired, the installer 22 may be designed to condition the software program 20 by prohibiting the installation of the software program 20 whenever the access variable within the hardlock 16 indicates that no further unused licenses are available.

Figure 3:
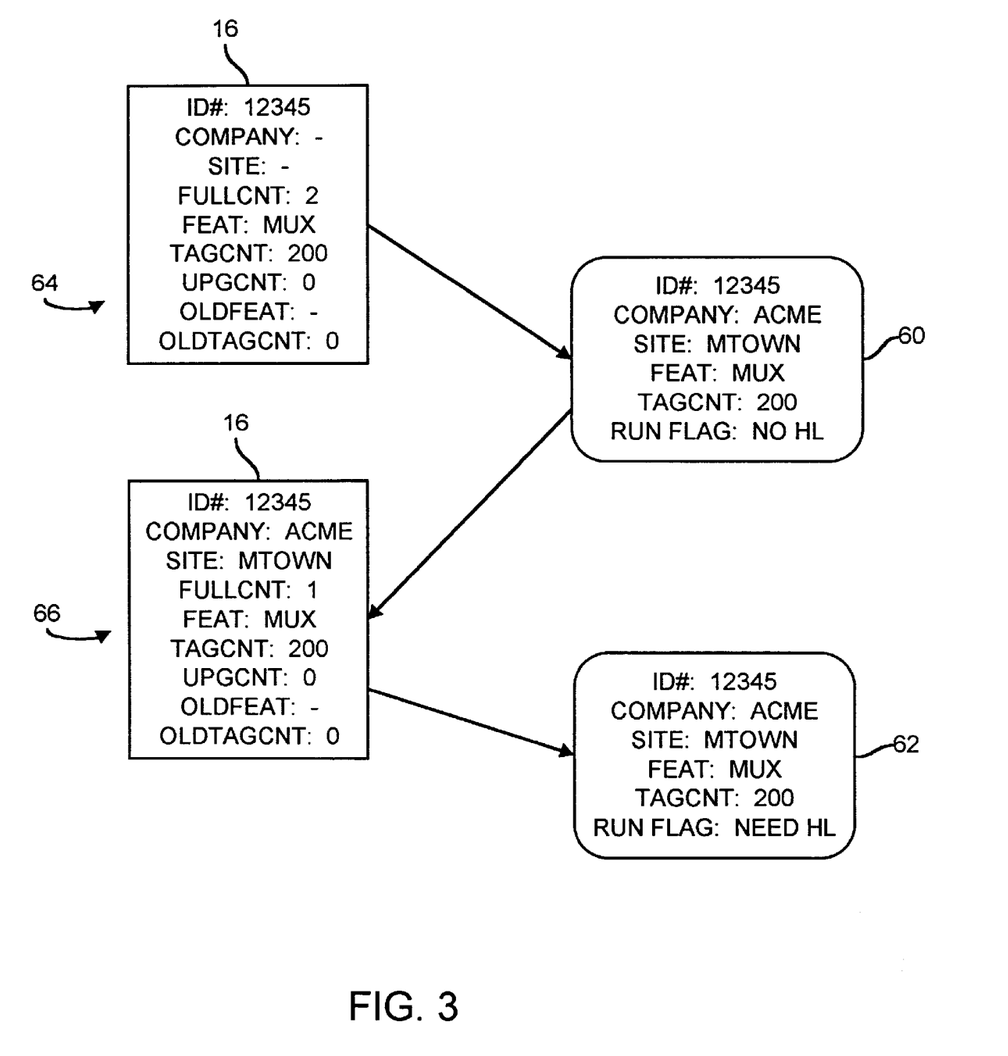
FIG. 3 is a flow chart illustrating the installation of a base program on a computer using the removable hardlock of the present invention.

FIG. 3 illustrates the state of certain variables within the hardlock 16 both before and after using the hardlock 16 to install the base software program 20 on computers 60 and 62. Before any installation, the hardlock 16 (as indicated at the block 64) stores an ID number (typically provided by the software provider or the licensor), a company and site variable (typically left blank by the software provider) and a FULLCNT (full count) variable that indicates the number of licenses currently associated with the hardlock 16. The FULLCNT variable may be set to a number that is one greater than the number of licenses purchased by the user for the base software program 20. The hardlock 16 also includes a FEAT (features) variable that indicates the features of the software program 20 associated with the hardlock 16 and a TAGCNT (tag count) variable that indicates the number of tags associated with the base software program 20. These tags might indicate, for example, the maximum number of devices to be controlled by a licensed process control software program. If desired, the hardlock 16 may also store an UPGCNT (upgrade count) variable that indicates the number of licenses available for an upgrade program associated with the hardlock 16. Typically, if the FULLCNT variable is set to any number greater than zero, then the UPGCNT variable is set to zero and vice-versa. The hardlock 16 may also store an OLDFEAT (old features) variable that is used when the software being installed is an upgrade to a software program already installed on a computer. The OLDFEAT variable indicates the features or identity of the installed program for which the upgrade program is designed. An OLDTAGCNT (old tag count) variable may be used to indicate the tag count of the software program already installed on a computer on which an upgrade program is to be installed. Of course the FEAT, TAGCNT, OLDFEAT, and OLDTAGCNT variables are set by the software vendor before the hardlock 16 is shipped to the software licensee. If, as in FIG. 3, the UPGCNT variable is set to zero, the OLDFEAT variable may be left blank.

To install the base software program 20 on the computer 60, the hardlock 16 (block 64) is inserted into an external port of the computer 60 and the base software program 20 is loaded onto the hard drive thereof. During installation, an installer of the computer 60 checks for the insertion of a proper hardlock using, for example, the hardlock interface 30 (FIG. 2). The installer then determines if the FULLCNT variable is greater than one and, if so, installs the base software program 20 on the computer 60 setting the run flag 24 of the base software program 20 to a state illustrated in FIG. 3 as "NO HL," indicating that the base software program 20 can be run without the hardlock 16 inserted in the computer 60.

During the installation process, the installer stores the ID number of the hardlock 16 in the computer 60. The installer may request the user to enter the company and site associated with the computer 16 and may then store this information in both the computer 60 and the hardlock 16 (block 66) as the company and site variables. The installer also copies the FEAT and TAGCNT variables from the hardlock 16 and stores the values of these variables in a memory of the computer 60 to indicate the features of the base software program 20 actually installed on the computer 60.

After a successful installation, the installer of the computer 60 decrements the FULLCNT variable on the hardlock 16 by one (block 66) to indicate that one of the previously available licenses has been used. The hardlock 16 can then be removed and used to install the base software program 20 in other computers until the FULLCNT variable of the hardlock 16 reaches one, as illustrated at the block 66.

When the FULLCNT variable on the hardlock 16 is equal to one, indicating that no further unused software licenses are available (block 66), and the hardlock 16 is inserted into, for example, the computer 62, an installer of the computer 62 will still install the base software program 20 on, and will copy the company, site, FEAT and TAGCNT variables to the computer 62, but will set the run flag to a second state illustrated in FIG. 3 as "NEED HL," indicating that the base software program will only run on the computer 62 when the hardlock 16 is physically inserted into the proper external port thereof. Because the installation of the base software program 20 on the computer 62 does not use any of the licenses purchased for that software but, instead, operates only to install a backup copy of that software on the computer 62 to be run when the hardlock 16 is installed in the external port of the computer 62, the installer of the computer 62 does not change the FULLCNT variable or any other variable of the hardlock 16.

If desired, during installation of the base software program 20 on any computer or machine other than the first computer, an installer may check to see if the company, site, and/or other information provided by a user match the values of those variables stored within the hardlock 16 and, in the event that a match does not occur, may prevent installation of the software program 20. This operation prevents the hardlock 16 from being transported to computers at other companies or sites for which software licenses have not been obtained, even when the hardlock 16 indicates that unused licenses are still available for the initial company and/or site. Likewise, as indicated above, during any installation of the software program 20 on any computer, the software program 20 is tied to a unique identifier associated with that computer to assure that the software program 20 can only be run on that computer.

Figure 4:
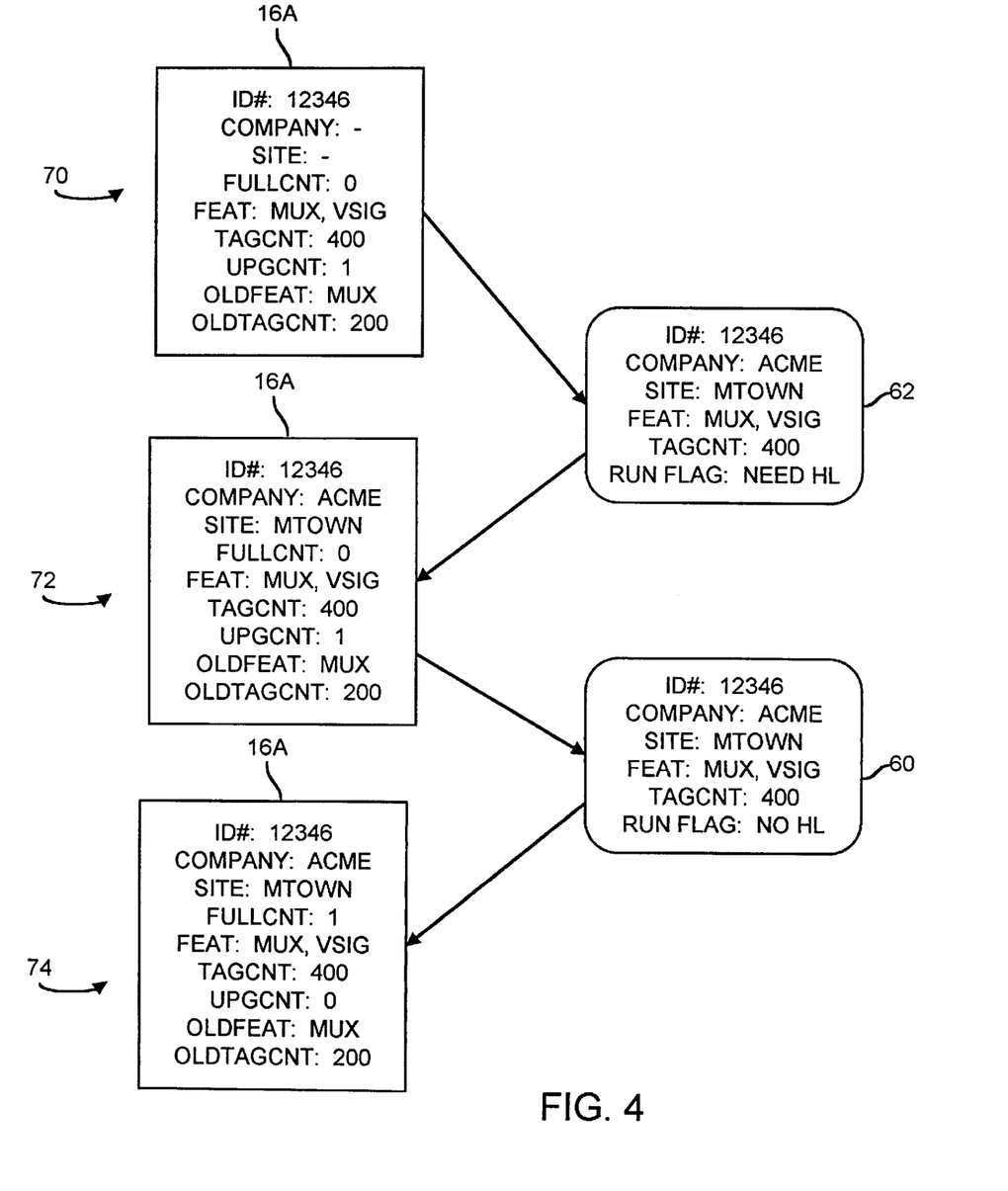
FIG. 4 is a flow chart illustrating the installation of an upgrade program on a computer having an installed base program using the removable hardlock of the present invention.

FIG. 4 illustrates the state of the variables within a removable hardlock 16a both before and after the removable hardlock 16a is used to install an upgrade program on the computers 60 and 62, each having a base software program 20 installed thereon in the manner illustrated in FIG. 3. In the example illustrated in FIG. 4, the UPGCNT variable of the hardlock 16a (block 70) is initially set to one, indicating that only one license for the upgrade program remains on the hardlock 16a. However, it should be understood that the UPGCNT variable can be set to any other positive number to indicate that more licenses for the upgrade program are available.

During installation of the upgrade program on the computer 62, which has the base program 20 stored with a run flag set to "NEED HL," the installer of the computer 62 first determines if the OLDFEAT and OLDTAGCNT variables of the hardlock 16a match the FEAT and TAGCNT variables associated with the base software program 20. If so, the installer identifies that the base software program installed on the computer 62 is a proper base program to which the upgrade program can be applied. The installer then installs the upgrade program on the computer 62 and stores the company and site variables that have been stored in the computer 62 for the base software program 20 on the hardlock 16a (block 72). During installation of the upgrade program, the ID, FEAT, and TAGCNT variables within the computer 62 are set equal to the ID, FEAT, and TAGCNT variables on the hardlock 16a, respectively, to identify the new program stored on the computer 62. However, the installer associated with the computer 62 leaves the run flag of the installed upgrade program set to "NEED HL" because the base software program 20 originally installed on the computer 62 had a run flag set equal to "NEED HL" indicating that a hardlock must be inserted into the computer 62 to run the base software program 20. Thus, the upgrade program installed on computer 62 will still require the hardlock 16a to be inserted into an external port thereof to run the upgrade program and, essentially, can still only operate as a backup copy of the upgrade program. Furthermore, the original hardlock 16 (FIG. 3) will no longer work to allow the use of a backup copy of the program now installed on the computer 62 because the ID, FEAT, and TAGCNT variables of the installed upgrade program do not match those of the original hardlock 16. Instead, the hardlock 16a must be inserted into the external port of the computer 62 to run the backup copy of the upgrade program now installed on the computer 62. Because the run flag of the upgrade program on the computer 62 is set equal to "NEED HL," the installer associated with the computer 62 does not decrement the UPGCNT variable on the hardlock 16a during installation (block 72).

Next, when the hardlock 16a (block 72) is inserted into the external port of the computer 60, the installer on the computer 60 compares the FEAT and TAGCNT variables of the base software program 20 installed thereon with the OLDFEAT and OLDTAGCNT variables on the hardlock 16a. If the installer finds that these variables match, the installer installs the upgrade program on the computer 60. Of course, if these sets of variables do not match, the installer of the computer 60 recognizes that it is not proper to install the upgrade program associated with the hardlock 16a with the base program currently installed on the computer 60 and prevents such installation.

When, as is the case with the computer 60 of FIG. 4, the run flag of the base software program 20 stored on the computer 60 is set to "NO HL," indicating that the base software program 20 can be run without the hardlock 16 installed in an external port of the computer 60, and the UPGCNT variable on the hardlock 16a is greater than zero, indicating that a license for the upgrade program is still available, the installer of the computer 60 sets the run flag of the newly installed upgrade program to "NO HL" and decrements the UPGCNT variable on the hardlock 16a (block 74) to indicate that one of the licenses thereon has been used. Thereafter, the hardlock 16a may be removed from the external port of the computer 60 and the upgrade program can be run thereby. Also, the hardlock 16a may be used to install the upgrade program on other computers until the UPGCNT variable reaches zero (e.g., block 74), at which time the FULLCNT variable may be set equal to one (block 74) to allow the hardlock 16a to be used to run a backup copy of the upgrade program.

As indicated above, a de-installer may operate to remove a software program and/or an upgrade program from any computer when a hardlock having the same, for example, ID, FEAT, and/or TAGCNT variables as the installed software program is inserted into an external port of the computer. During this process, the de-installer may increment the FULLCNT or UPGCNT variable within the hardlock 16 or 16a (when the de-installed program has a run flag set to the state indicating that the program can be run without the hardlock inserted into an external port of the computer) to thereby indicate that the hardlock 16 or 16a now has one additional unused license associated therewith.

While the system and method for using a removable hardlock described herein includes a FULLCNT and/or an UPGCNT variable that indicates the number of unused licenses available with a hardlock, other variables and values for these variables could be used or stored as the access variable and still fall within the scope of this invention, as long as the access variable can be changed from one state to another state to indicate that there are no more unused licenses available with the hardlock. Moreover, other mechanisms besides a run flag could be used to prevent or enable implementation of the software program 20 when the removable hardlock 16 or 16a is removed from the external port 14 of the computers 10, 60, and 62.

Furthermore, if desired, the removable hardlocks 16 and/or 16a can store other information pertaining to the software program, the computers, the user, the software licensor, etc. and this additional information can be used in connection with the above-described information to install or de-install software in any desired manner. Still further, while the installer, de-installer, and hardlock interface have been generally described herein as separate software programs stored in a computer and/or supplied with the licensed software, these programs could, instead or additionally, be part of the licensed software and/or could be stored on the removable hardlock, or at any other desired location. Furthermore, these components could additionally or alternatively be implemented in firmware or hardware supplied with, for example, the licensed software or the removable hardlock.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

We claim:

1. A software protection system adapted to enable implementation of a software program on a computer having an external port, the software protection system comprising:
 a removable hardlock adapted to be inserted into the external port of the computer, said removable hardlock including an access variable set to one of a plurality of values; and
 an installer that installs the software program on the computer when the removable hardlock is inserted into the external port of the computer, including;
 means for reading the access variable, and
 means for conditioning the software program to prevent the software program from being implemented on the computer when the access variable is set to a first value and the removable hardlock is removed from the external port and to allow the software program to be implemented on the computer when the access variable is set to a second value and the removable hardlock is removed from the external port.

2. The software protection system of claim 1, further including a hardlock interface including means for detecting when the removable hardlock is inserted into the external port and means for enabling the software program to be implemented by the computer when the detecting means detects that the removable hardlock is inserted into the external port.

3. The software protection system of claim 1, wherein the installer includes means for changing the value of the access variable on the removable hardlock when the conditioning means conditions the software program to allow the software program to be implemented by the computer when the removable hardlock is removed from the external port.

4. The software protection system of claim 3, wherein the changing means changes the value of the access variable from the second value to the first value.

5. The software protection system of claim 3, wherein the changing means decrements the access variable value.

6. The software protection system of claim 1, wherein, at any particular time, the value of the access variable indicates the number of further computers on which the software program can be installed and then implemented without the removable hardlock inserted into an external port of the further computers.

7. The software protection system of claim 1, wherein the software program is an upgrade program and wherein the value of the access variable indicates the number of further computers on which the upgrade program can be installed and then implemented without the hardlock inserted into an external port of the further computers.

8. The software protection system of claim 1, wherein the removable hardlock is adapted to be inserted into the external port of the computer when the computer has an installed program installed thereon,
 wherein the software program is an upgrade program,
 wherein the removable hardlock includes a further variable that stores a first set of parameters identifying a base program with which the upgrade program can be installed, and wherein the installer includes means for comparing a second set of parameters identifying the installed program with the first set of parameters to determine if the first and second sets of parameters match and means for preventing installation of the upgrade program on the computer when the first and second set of parameters do not match.

9. The software protection system of claim 8, wherein the removable hardlock includes another variable relating to the upgrade program and wherein the installer includes means for storing values associated with the another variable in the computer when the upgrade program is installed on the computer.

10. The software protection system of claim 1, wherein the removable hardlock includes a set of further variables relating to the identification of the computer and the installer includes means for obtaining values relating to the identification of the computer and means for storing the obtained values in the removable hardlock as the set of further variables.

11. The software protection system of claim 1, wherein the access variable indicates a first number of different computers on which the software program can be installed, and further including a de-installer that de-installs the software program from the computer, the de-installer including means for changing the access variable to indicate that the software program can be installed on a second number of different computers greater than the first number.

12. The software protection system of claim 1, wherein the installer includes means for associating implementation of the software program to a unique identifier related to the computer so that the software program will only run on a computer having the unique identifier.

13. A software protection system for installing a software program on a computer having an external port, comprising:
   a removable hardlock adapted to be inserted into the external port, said removable hardlock including a variable stored in a memory; and
   an installation program that installs the software program on the computer when the removable hardlock is inserted into the external port, the installation program including means for setting a value of a run flag associated with the software program based on a value of the variable, wherein the run flag enables the software program to be implemented on the computer when the hardlock is removed from the external port and the run flag is set to a first state and wherein the run flag prevents the software program from being implemented on the computer when the hardlock is removed from the external port and the run flag is set to a second state.

14. The software protection system of claim 13, further including means for enabling the software program to be implemented on the computer when the removable hardlock is installed in the external port of the computer.

15. The software protection system of claim 13, wherein the installation program includes means for changing the variable when the installation program sets the run flag to the first state.

16. The software protection system of claim 13, wherein the software program is an upgrade program,
wherein the computer includes an installed program installed thereon,
wherein the memory stores a second variable indicating a base program with which the upgrade program can be installed, and
wherein the installation program includes means for comparing an installed program variable indicating the installed program with the second variable and means for preventing the installation of the upgrade program when the installed program variable does not match the second variable.

17. The software protection system of claim 16, wherein the memory stores a third variable relating to the upgrade program and wherein the installation program includes means for reading the third variable and means for storing the third variable in the computer as associated with the upgrade program when the upgrade program is installed on the computer.

18. The software protection system of claim 13, wherein the installation programs includes means for associating implementation of the software program to a unique identifier related to the computer so that the software program will only run on a computer having the unique identifier.

19. A method of preventing unauthorized implementation of a software program comprising the steps of:
   providing an identification of the number of authorized implementations of the software program on a removable hardlock that is capable of being inserted into a port of a computer;
   using the removable hardlock to install the software program on the computer when the removable hardlock is installed in the port of the computer; and
   at the time of installation on the computer, storing an indication of whether the software program can be implemented on the computer when the removable hardlock is removed from the port of the computer based on the identification of the number of authorized implementations stored on the removable hardlock.

20. The method of preventing unauthorized implementation of a software program of claim 19, further including the step of reducing the identification of the number of authorized implementations of the software program on the removable hardlock when the step of storing stores an indication that the software can be implemented on the computer with the removable hardlock removed from the port of the computer.

21. The method of preventing unauthorized implementation of a software program of claim 19, wherein the software program is an upgrade program, and further including the steps of storing, on the hardlock, an identification of a base program that must be installed on the computer to install the upgrade program on the computer, comparing the identification of the base program with an identification of an actual program installed on the computer and preventing the installation of the upgrade program when the identification of the base program stored on the hardlock does not match the identification of the actual program installed on the computer.

* * * * *

UNITED STATES PATENT AND TRADEMARK OFFICE
CERTIFICATE OF CORRECTION

PATENT NO. : 6,023,763
DATED : February 8, 2000
INVENTOR(S) : Grumstrup, et. al.

It is certified that error appears in the above-identified patent and that said Letters Patent is hereby corrected as shown below:

Title page, item [73], "Mich" should be "Missouri."

Signed and Sealed this

Twenty-seventh Day of February, 2001

Attest:

NICHOLAS P. GODICI

Attesting Officer

Acting Director of the United States Patent and Trademark Office